United States Patent [19]
Goedeke et al.

[11] Patent Number: 5,126,744
[45] Date of Patent: Jun. 30, 1992

[54] BEACON AND MODE-4 DEFRUITER

[75] Inventors: Harry S. Goedeke, Baltimore; Elbert L. Cole, Jr., Catonsville; Michael J. Ransford; Steven D. Mirra, both of Columbia, all of Md.

[73] Assignee: Westinghouse Electric Corp., Pittsburgh, Pa.

[21] Appl. No.: 648,668

[22] Filed: Jan. 31, 1991

[51] Int. Cl.$^5$ ............................................. G01S 13/00
[52] U.S. Cl. ..................................................... 342/40
[58] Field of Search ......................................... 342/40

[56] References Cited

U.S. PATENT DOCUMENTS 4,896,158  1/1990  Cole, Jr. ................................. 342/40

OTHER PUBLICATIONS

Data Processor PDR; ARSR-4 Data Processor, UTC, Data Collection/Disk and Beacon Detector; May 3, 1989.
Data Processor CDR; Scott Goedeke; Mode 4 Detector HWCI; Aug. 23, 1989; Sep. 8, 1989.
Data Processor CDR; Scott Goedeke; Beacon Detector HWCI; Sep. 21, 1990.

Primary Examiner—Mark Hellner

[57] ABSTRACT

A defruiter for filtering fruit replies from a reply data signal in a radar system. The defruiter includes a window memory, a main memory, a counter and a main defruiter. Another version of the defruiter includes the items listed above and, additonally, a data memory and a buffer. The window memory stores reply data for a number of range intervals and a number of pulse repetition times. The main memory provides and receives reply data to and from, respectively, the window memory. The counter determines the number of replies occurring in a number of range intervals and a number of pulse repetition times. The main defruiter allows reply data to be provided to a data processor of the radar system when a reply occurs in the center part of the window memory and when the number of replies determined by the counter is greater than or equal to a window parameter. The number of fruit replies occuring within the reply data supplied to the data processor of the radar system is therefore reduced. The defruiter also provides near miss processing capability is mode-4 for filtering fruit near miss replies from a reply data signal.

20 Claims, 10 Drawing Sheets

CONTROL SIGNALS (START OF PRT)

FIG. 9

CONTROL SIGNALS (END OF PRT)

BEACON AND MODE-4 DEFRUITER

BACKGROUND OF THE INVENTION

1. Field of the Invention

This invention is directed to a device and method for removing fruit replies from a reply data signal to produce a defruited data signal which is provided to a data processor in a radar system for further processing.

2. Description of Related Art

Radar systems commonly use an interrogator/receiver and antenna system for soliciting information from aircraft passing within range of the radar system. The interrogator/receiver and antenna system typically sends an interrogation signal outward at each range and azimuth interval within the radar system's coverage area. Aircraft present at a given range and azimuth interval respond to the interrogation signal by sending a reply signal carrying the solicited information to the interrogator/receiver and antenna system. However, it occasionally happens that a different aircraft responding to a different interrogator/receiver and antenna system sends an unsolicited reply signal to the subject interrogator/receiver and antenna system. This false reply signal is termed 'fruit' (false reply unsynchronized in time). In order for a radar system to operate properly, provision must be made to prevent the radar system from interpreting the fruit reply as a true reply. In an environment in which the number of fruit replies received by a radar system is large, an excessive amount of computing time is absorbed by a data processor in eliminating fruit replies.

Radar systems commonly operate in one of two modes. 'Beacon' mode is primarily used by commercial aircraft while 'mode-4' is commonly used by military aircraft. In beacon mode, reply data is processed to determine whether no reply or a true reply occurred in a given range interval for a given pulse repetition time (PRT). A pulse repetition time is the time required by the radar system to complete one sweep of the coverage area of the radar system. In contrast, mode-4 reply data is processed to determine whether no reply, a near miss or a true reply occurred in a given range interval for a given PRT. A near miss reply is defined as the absence of a reply at the same range as a true reply occurring within an interval of PRTs after a true reply. The purpose of detecting near miss replies for mode-4 processing is to provide information on the spoof environment in the vicinity of true replies to determine if the target is a friend or foe. Consequently, mode-4 operation requires that near miss replies be processed in addition to no and true replies. In either mode-4 or beacon mode, replies must be evaluated to determine whether such replies are fruit.

Figure 1:
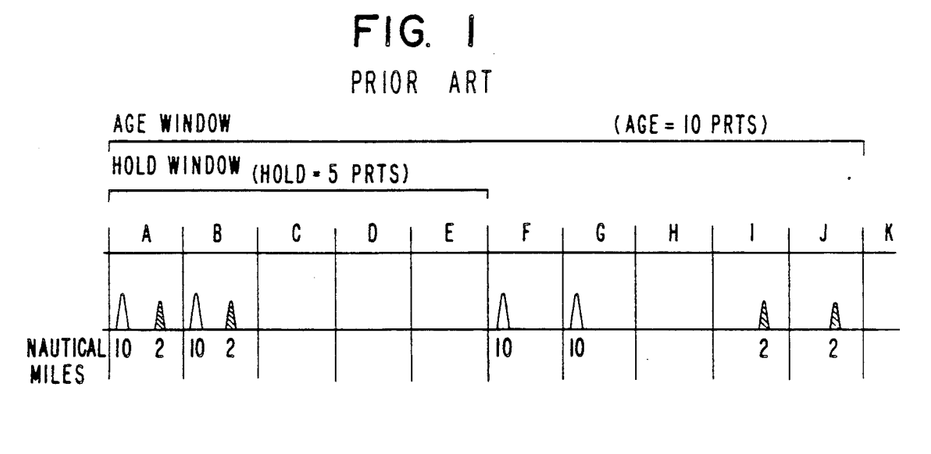
FIG. 1 is a diagram which illustrates the operation of a prior art embodiment of a fruit filter.

One technique for reducing the number of fruit replies received by a data processor of a radar system operating in beacon mode, and therefore the processing time expended by the data processor in beacon mode, is disclosed in the U.S. Pat. No. 4,896,158 (the '158 filter). Referring to FIG. 1, the '158 filter includes an age window which stores reply data corresponding to a predetermined number of pulse repetition times (PRTs). A pulse repetition time is the time required by the radar system to complete one sweep of the coverage area of the radar system. The age window of the '158 filter is further divided into a hold window which includes reply data for a smaller number of PRTs than that of the age window. The '158 filter observes the hold window and determines the number of related replies occurring within each of the PRTs included within the hold window. When the number of related replies within the hold window is below a threshold value, the '158 filter eliminates those replies as fruit replies. On the other hand, when the number of related replies included within the hold window is greater than or equal to the threshold value, the '158 filter then observes the age window to determine the total number of related replies included within the age window. When the total number of related replies included within the age window is below a second threshold value, the total related replies are discarded by the '158 filter as fruit. Conversely, if the total number of related replies within the age window is greater than or equal to the second threshold value, the reply data corresponding to the total number of related replies is provided to the data processor of the radar system for further processing.

The efficiency of the '158 filter is decreased due to the fact that, in general, the reply data provided to the data processor of the radar system is not received in the sequential PRT in which the reply data was received by the radar system. This problem occurs because the reply data pertaining to a particular number of related replies is provided to the data processor whenever the particular number of related replies exceeds the first and second threshold values for the hold and age window, respectively. For purposes of illustration of the problem, assume that in FIG. 1 the first threshold value for the hold window is 2, that the second threshold value for the age window is 4, that a first set of related replies occur in PRTs A, B, F and G, and that a second set of related replies occur in PRTs A, B, I and J. Both sets of related replies will be considered true replies by the '158 filter. However, they are provided to the data processor simultaneously even though the first reply in each of the two sets was received at different PRTs by the radar system. This problem requires the data processor to expend computing time in correlating replies with the actual PRT in which they occurred. Thus, there is a need in the art for a filter which eliminates the computing time needed to arrange replies which are provided to the data processor of a radar system in the sequential order in which such replies are received by the radar system. Further, there is a need in the art for a filter which operates in mode-4 since the '158 filter does not provide a fruit filter with near miss processing capability.

SUMMARY OF THE INVENTION

An object of the present invention is to provide a system for filtering fruit replies occurring in a radar system.

Another object of the present invention is to reduce the processing time required by a data processor by eliminating the need to correlate replies which are determined to be true or near miss replies with the PRT in which they occur.

Another object of the present invention is to provide fruit filtering for mode-4 applications, including near miss processing capability.

Another object of the present invention is to provide a filter for fruit replies, which is adaptable to varying fruit density environments.

Another object of the present invention is to provide a radar system which has resistance to intentional jamming by filtering out single sweep strobes.

Another object of the present invention is to provide a fruit filtering system equipped with built-in self-testing capability.

Another object of the present invention is to provide defruiting capability in a system in which the PRT length varies.

A further object of the present invention is to provide relatively inexpensive fruit filtering capability.

The objects are obtained by the system herein disclosed. According to the present invention, there is provided an apparatus for filtering fruit replies from a reply data signal in a radar system, comprising: means for summing a number of replies occurring in first selected range intervals and first selected pulse repetition times of the reply data signal to provide a first result; means for determining whether the first result is greater than or equal to a window parameter to provide a second result; and means for outputting a defruited data signal which is responsive to a second selected range interval and a second selected pulse repetition time of the reply data signal, based on the second result.

According to the present invention, there is also provided an apparatus for filtering fruit replies from a reply data signal in a radar system, comprising: means for determining whether a reply occurred in a first selected range interval and first selected pulse repetition times to provide a first result; means for receiving a second result indicative of whether a reply occurred in a second selected range interval and a second selected pulse repetition time based on the first result; means for terminating processing of a potential near miss reply and waiting a first selected number of pulse repetition times based on the second result; means for waiting a second selected number of pulse repetition times and for summing a number of replies occurring in third selected range intervals and third selected pulse repetition times to provide a third result, based on the second result; means for determining whether the third result is greater than or equal to a third selected number to provide a fourth result; and means for outputting a defruited data signal based on the reply data signal and the fourth result.

These together with other objects and advantages, which will become subsequently apparent, reside in the details of construction and operation as more fully hereinafter described and claimed, reference being had to the accompanying drawings, forming a part hereof, wherein like numerals refer to like parts throughout.

DESCRIPTION OF THE PREFERRED EMBODIMENTS

Figure 2:
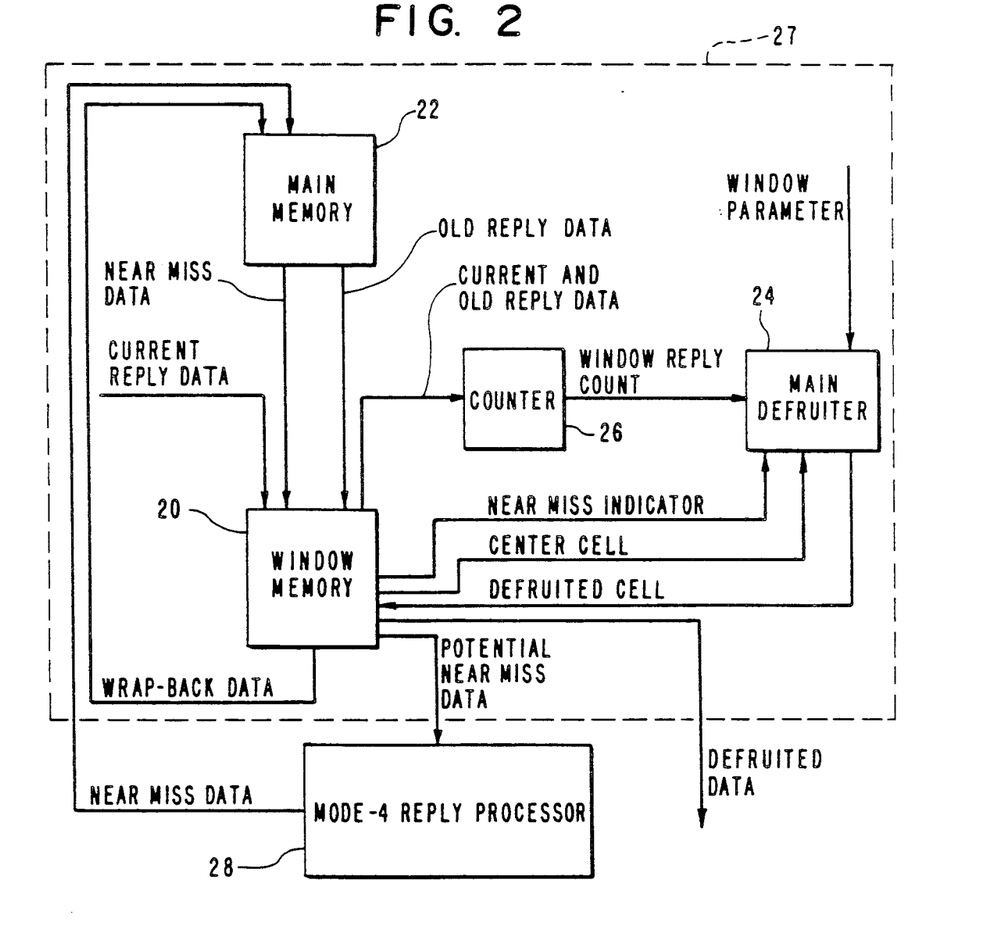
FIG. 2 is a block diagram of a first embodiment of a fruit filter in accordance with the present invention.

FIG. 2 is a block diagram of a preferred embodiment of the present invention. A window memory 20, a main memory 22, a main defruiter 24, and a counter 26 form a defruiter system 27. The defruiter system 27 provides a potential near miss data signal to mode-4 reply processor 28 which is not part of the present invention. Mode-4 reply processor 28 provides the defruiter system 27 with a near miss data signal responsive to the potential near miss data signal.

A current reply data signal is received from an interrogator/receiver and antenna system (not shown) and stored by the window memory 20. The window memory 20 also receives and stores an old reply data signal corresponding to selected previous PRTs, from a main memory 22. The window memory 20 generates a center cell signal based on a part of the old reply data signal corresponding to a selected range interval and PRT. The center cell signal is provided to the main defruiter 24. When a reply occurs within the selected range interval and PRT corresponding to the center cell signal, the main defruiter 24 initiates an analysis of the reply within the center cell signal to determine whether that reply is fruit.

The analysis used by the main defruiter 24 requires a determination of whether there are any related replies in past or future PRTs relative to the subject reply. To accomplish this determination, the window memory 20 generates a current and old reply data signal based on the current reply data signal and the old reply data signal stored in the window memory 20. The current and old reply data signal is provided to the counter 26 which sums the number of related replies occurring within the current and old reply data signal. The counter 26 provides a window reply count signal based on the sum to the main defruiter 24. The main defruiter 24 determines whether the window reply count signal is greater than or equal to a window parameter signal which is variable to accommodate different fruit density environments. When the window reply count signal is greater than or equal to a selected number, the main defruiter 24 deactivates a defruited cell signal, so that the part of the old reply data signal corresponding to the selected range interval and PRT of the center cell signal is not modified. On the other hand, when the window reply count signal is less than the selected number, the main defruiter 24 activates the defruited cell signal to modify that part of the old reply data signal corresponding to the selected range interval and PRT of the center cell signal. The window memory 20 outputs a defruited data signal based on the old reply data signal and the defruited cell signal.

In FIG. 2, the counter 26 is a means for summing a number of replies occurring in first selected range intervals and first selected pulse repetition times of the reply data signal which provides a first result. The main defruiter 24 is a means for determining whether the first result is greater than or equal to a window parameter which provides a second result. The window memory 20 is a means for outputting a defruited data signal corresponding to a second selected range interval and a second selected PRT of the reply data signal, which is based on the second result. The window reply count signal corresponds to the first result and the defruited cell signal corresponds to the second result.

The operation of the embodiment of FIG. 2 is explained as follows. When a reply occurs in a selected range interval and a selected pulse repetition time, a number of replies occurring in first selected range intervals and first selected PRTs of the reply data signal is summed to provide a first result. It is then determined whether the first result is greater than or equal to a window parameter to provide a second result. On the basis of the second result, reply data is read or not read from the window memory 20. Control then enters a wait state until the next PRT. The entire process is then repeated for the next PRT.

The block diagram of FIG. 2 as it relates to mode-4 near miss reply processing is explained as follows. A current reply data signal from the interrogator/receiver and antenna system (not shown) corresponding to the current PRT is received and stored by the window memory 20. The window memory 20 also receives and stores an old reply data signal corresponding to selected range intervals and selected previous PRTs from the main memory 22. Using the old reply data signal, the window memory 20 determines whether a reply occurred in a first selected range interval and first selected PRTs to provide a potential near miss data signal. The potential near miss data signal is then provided to a mode-4 reply processor 28 which determines whether a reply occurred in a second selected range interval and a second selected PRT. When a reply occurs within the second selected range interval and the second selected PRT, the mode-4 reply processor 28 deactivates the near miss data signal to indicate that no near miss occurred. On the other hand, if no reply occurs in the second selected range interval and the second selected PRT, the mode-4 reply processor 28 activates the near miss data signal which is received and stored by the main memory 22.

The main memory 22 then provides the near miss data signal to the window memory 20. When the mode-4 reply processor 28 activates the near miss data signal, the window memory 20 activates a near miss indicator signal after a selected number of PRTs on the basis of the near miss data signal provided to the window memory 20 by the main memory 22. When the near miss indicator signal is activated by the window memory 20, the main defruiter 24 initiates an analysis to determine whether that part of the near miss data signal corresponding to the PRT which activated the near miss indicator signal is a fruit reply.

To enable the main defruiter 24 to carry out the defruiting operation, the window memory 20 provides a current and old reply data signal corresponding to third selected range intervals and third selected PRTs to the counter 26. The counter 26 sums the number of replies occurring in the current and old reply data signal for the third selected range intervals and the third selected PRTs. The counter 26 provides a window reply count signal based on the sum to the main defruiter 24. When the main defruiter 24 determines that the window reply count signal is greater than or equal to a selected number, the main defruiter 24 deactivates the defruited cell signal. The defruited cell signal which is provided to the window memory 20 then has no effect on the old reply data signal output as the defruited data signal. On the other hand, when the main defruiter 24 determines that the window reply count signal is less than the selected number, the main defruiter 24 activates the defruited cell signal to modify the old reply data signal stored in the window memory 20 to eliminate the fruit reply from the old reply data signal. The window memory 20 then outputs the defruited data signal on the basis of the old reply data signal and the defruited cell signal. The defruited data signals are then provided to a data processor of the radar system (not shown) for further processing.

The window memory 20 is a means for determining whether a reply occurred in a first selected range interval and first selected pulse repetition times which provides a first result. The main memory 22 is a means for receiving a second result indicative of whether a reply occurred in a second selected range interval and a second selected pulse repetition time based on the first result. The window memory 20 is also a means for terminating processing of a potential near miss reply and waiting a first selected number of pulse repetition times based on the second result. Window memory 20, main memory 26 and counter 26 form a means for waiting a second selected number of pulse repetition times and a means for summing a number of replies occurring in third selected range intervals and third selected pulse repetition times to provide a third result, based on the second result. The main defruiter 24 is a means for determining whether the third result is greater than or equal to a third selected number to provide a fourth result. Lastly, the window memory 20 is a means for outputting a defruited data signal which is responsive to a fourth selected range interval and a fourth selected pulse repetition time of the old reply data signal, based on the fourth result.

The operation of the embodiments of FIG. 2 as it pertains to near miss processing in mode-4 is explained as follows. A determination is made to establish whether any replies occurred in a first selected range interval and first selected PRTs. If no such reply occurs, control moves to a wait state for one PRT before the same determination is made for the next PRT. On the other hand, when such a reply occurs, the mode-4 reply processor 28 is informed of the existence of such reply. The mode-4 reply processor 28 then determines whether another reply occurred in a second selected range interval occurring in a second selected PRT. If another reply does occur, a record is set to zero to indicate that no near miss reply exists. Control then enters a wait state until the current PRT elapses. On the other hand, if another reply does not occur in the second selected range interval for the second selected PRTs, the record is set to one to indicate that a near miss reply occurred. Control then enters a wait state until the expiration of a selected number of PRTs at which time the number of replies occurring in third selected range intervals and third selected PRTs is summed and compared with a selected number. If the number of replies is greater than or equal to the selected number, the reply data corresponding to the near miss reply is provided to a data processor for the radar system. On the other hand, if the number of replies is less than the selected number, the reply data corresponding to the fruit reply is not provided to the data processor of the radar system and such reply data is discarded.

Figure 3:
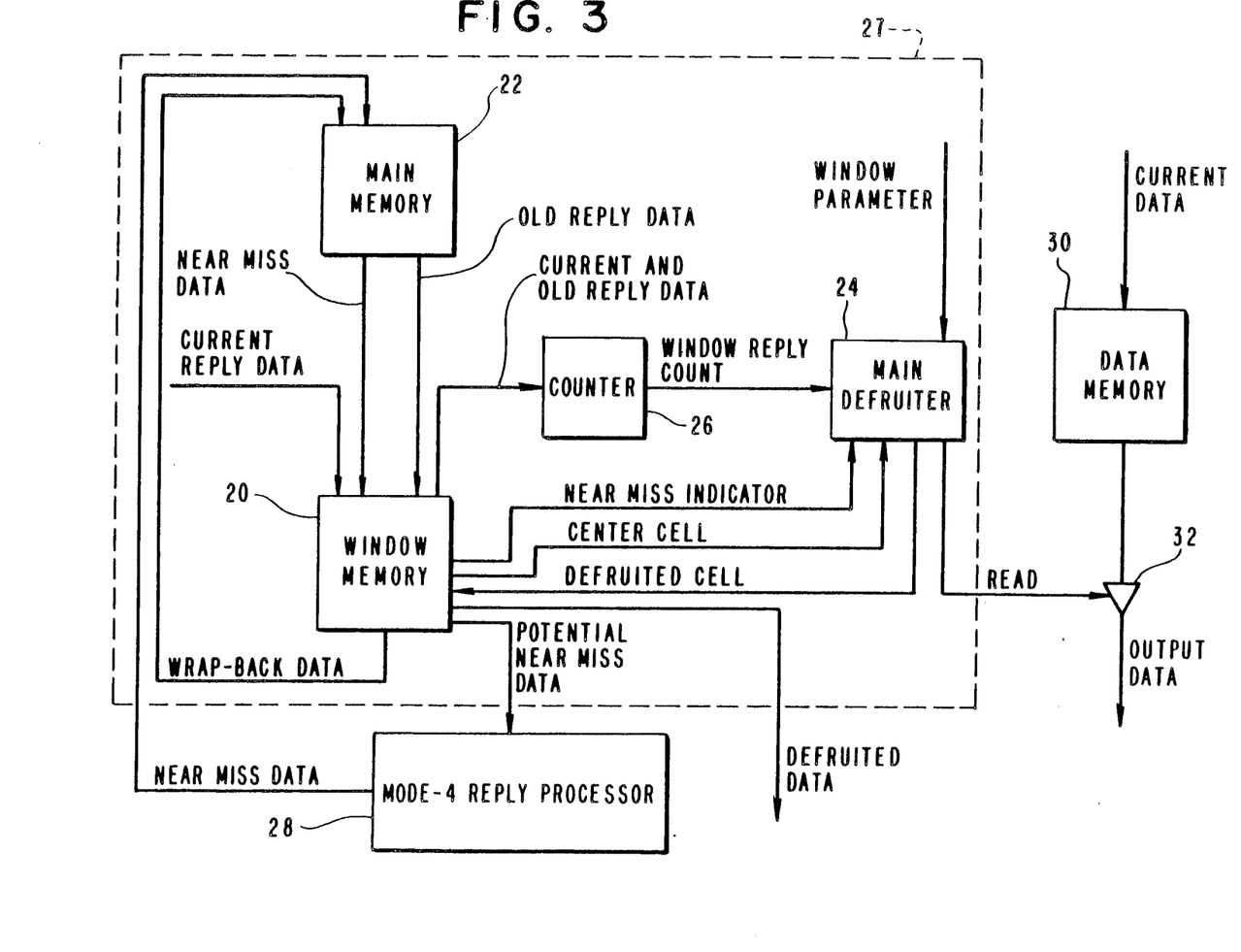
FIG. 3 is a block diagram of a second embodiment of the fruit filter in accordance with the present invention.

FIG. 3 is a block diagram of another embodiment of the present invention. This embodiment is similar to that of FIG. 2. However, in FIG. 3 the current reply data signal includes information indicating only whether a reply occurred in each range interval for the current PRT. Any reply data pertaining to replies indicated by the current reply data signal are included within the current data signal provided to a data memory 30. When the main defruiter 24 determines that a reply is a true reply, the main defruiter 24 activates a read signal to allow reply data at the output of data memory 30 to be provided to a data processor for the radar system through a buffer 32 as an output data signal. On the other hand, when the main defruiter 24 determines that a reply is fruit, the read signal is deactivated so that reply data corresponding to the fruit reply is not provided to the data processor of the radar system through a buffer 32 as the output data signal and such data is therefore discarded.

Figure 4:
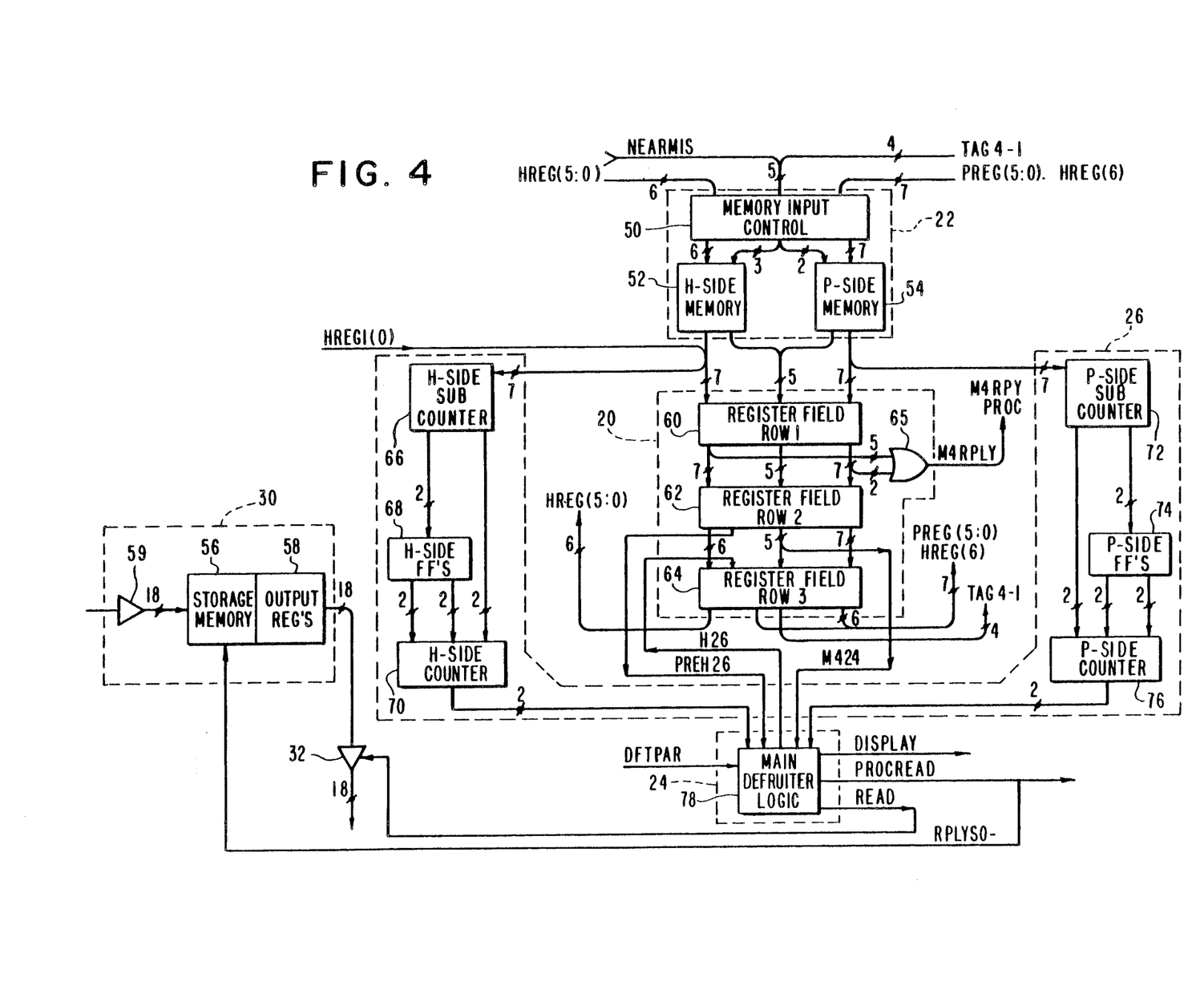
FIG. 4 is a detailed block diagram of the second embodiment of the fruit filter in accordance with the present invention.

FIG. 4 is a detailed block diagram of the embodiment of the present invention shown in FIG. 3. The correspondence between the elements of FIG. 4 and FIG. 3 are shown by dashed lines in FIG. 4. The memory input control 50, the H-side memory 52 and the P-side memory 54 are the main memory 22. The storage memory 56, the output registers 58 and storage memory input buffer 59 are the data memory 30. Register field row 1 (60), register field row 2 (62), register field row 3 (64) and OR gate 65 form the window memory 20. The H-side sub-counter 66, H-side flip-flops 68, H-side counter 70, P-side sub-counter 72, P-side flip-flops 74 and P-side counter 76 form the counter 26. The main defruiter logic 78 is the main defruiter 24. HREGI(0) is the current reply data signal of FIG. 3. The outputs of the H-side memory 52 and the P-side memory 54 are the old reply data signal of FIG. 3. The inputs to H-side sub-counter 66 and P-side sub-counter 72 are the current and old reply data signal of FIG. 3. The outputs of H-side counter 70 and P-side counter 76 are the window reply count signal of FIG. 3. PREH26 is the center self signal while H26 is the defruited cell signal of FIG. 3. DFTPAR is the window parameter signal of FIG. 3. HREG(5:0), PREG (5:0), HREG (6) and TAG4-1 are the wrap-back data signal of FIG. 3. M4RPLY is the potential near miss data signal of FIG. 3. NEARMIS is the near miss data signal of FIG. 3. Lastly, M424 is the near miss indicator signal of FIG. 3.

Figure 5:
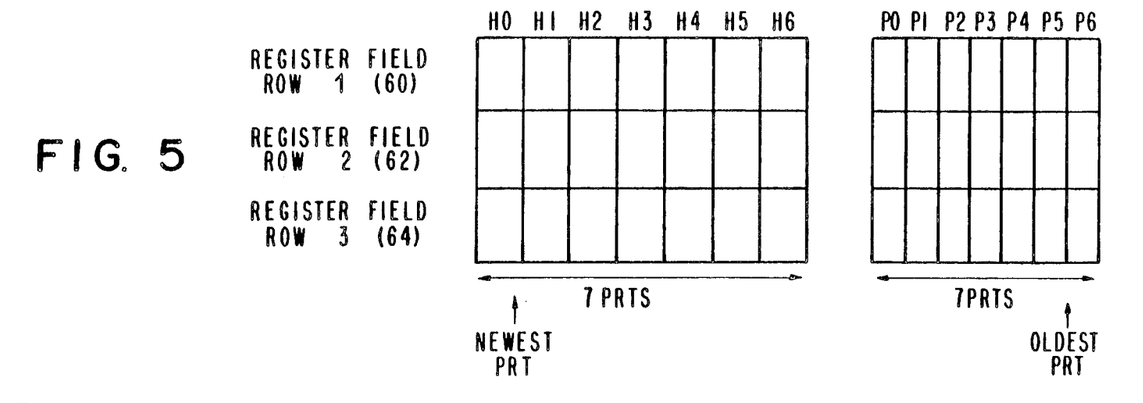
FIG. 5 is a diagram showing the structure of the register fields 60, 62 and 64 of FIG. 4 in beacon mode.

In beacon operation, register field rows 60, 62 and 64 have the structure of FIG. 5. H0–H6 and P0–P6 correspond to bits which indicate whether a reply occurred within each of the PRTs for which data is stored in the register field rows 60, 62 and 64. Thus, H0 corresponds to a bit indicating whether a reply occurred in the current PRT while P6 is a bit which indicates whether a reply occurred in the last PRT stored in the register field rows 60, 62 and 64. All of the range intervals for a given azimuth interval are sequentially clocked through register field rows 60, 62, and 64 and returned to the H-side memory 52 and the P-side memory 54 once every PRT. However, reply data in bit P6 corresponding to the oldest PRT is not returned to H-side memory 52 and the P-side memory 54. Consequently, reply data moves one bit from left to right in FIG. 5 during each PRT. The logical state stored in bit H6 of register field row 62 is provided to the main defruiter logic 78 as the signal PREH26. When this bit indicates that a reply occurred, the main defruiter logic 78 observes the outputs of H-side counter 70 and P-side counter 76. These outputs correspond to a summation of bits H0–H5 and P0–P6, respectively, for all of the register field rows 60, 62 and 64. When the result of the summation is greater than or equal to the signal DFTPAR, the main defruiter logic 78 activates the read signal (which includes READ and RPLYSO- in FIG. 4) to enable the data processor of the radar system to read the reply data corresponding to bit H6 of register field row 62. On the other hand, if the result of the summation is less than signal DFTPAR, the defruiter logic 78 deactivates the read signal so that reply data corresponding to the bit H6 of register field row 62 is not provided to the data processor of the radar system and is therefore discarded. In this case, the main defruiter logic 78 also activates signal H26 to eliminate the record of a reply occurring in bit H6 of register field row 62. By the time the main defruiter logic 78 performs this operation, the subject bit H6 of register field row 62 has actually moved to bit H6 of register field row 64. For this reason, the signal H26 is supplied to bit H6 of the register field row 64 so that the record of the reply is correctly eliminated.

Although the main defruiter logic 78 provides the read signal to a buffer 32 connected to the output registers 58, for example, the read signal could as well be provided to the data processor of the radar system which then determines whether to read the reply data supplied by the output registers 58 based on the read signal.

Figure 6:
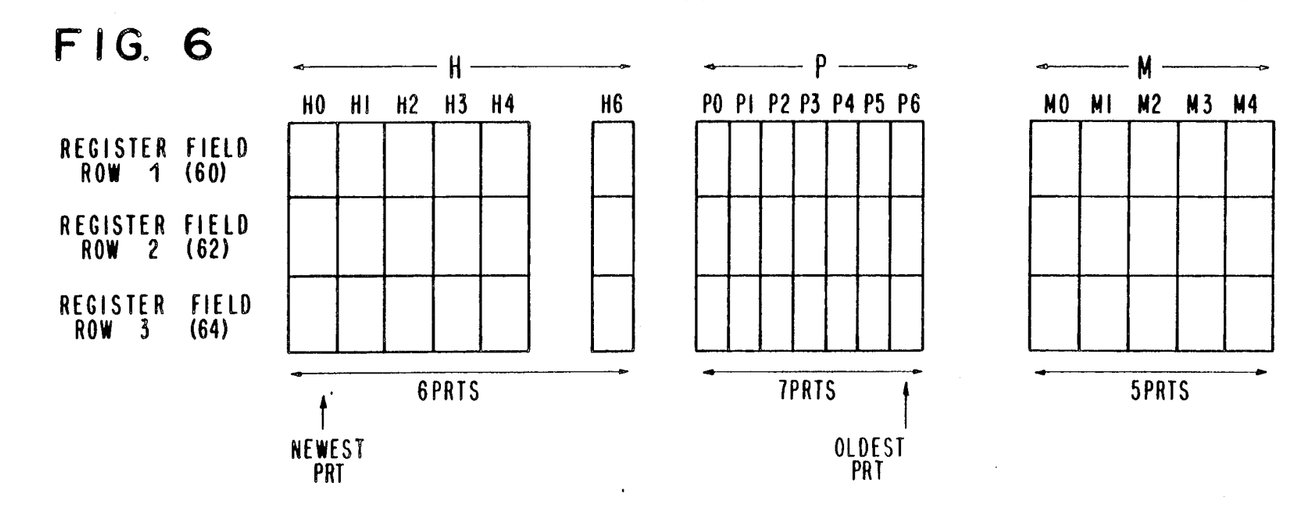
FIG. 6 is a diagram showing the structure of the register fields 60, 62 and 64 of FIG. 4 in mode-4.

FIG. 6 is a diagram of the structure of register field rows 60, 62, 64 of FIG. 4 during mode-4 operation. The part of mode-4 operation which does not include near miss reply processing is generally the same as that described above except that the output provided by H-side counter 70 does not include data for bit H5 in any register field row. Also, to provide near miss processing capability, bits M0–M4 are added to the register field to provide a record for near misses.

The operation of near miss reply processing in mode-4 for the embodiment of FIG. 4 will now be explained with reference to FIG. 6. OR gate 65 observes bits H0–H4, H6, P0 and P1 at the output of register field row 60 to determine whether a reply occurred within any of those bits. If any of the subject bits reflects that a reply occurred, the mode-4 reply processor 28 is so alerted. The mode-4 reply processor 28 then determines whether a reply exists in the H0 bit corresponding to the same range interval which was observed by OR gate 65. If such a reply occurs, the mode-4 reply processor 28 deactivates signal NEARMIS to indicate that no near miss occurred. On the other hand, when no such reply occurs, the mode-4 reply processor 28 activates the signal NEARMIS to indicate that a near miss has occurred.

The signal NEARMIS is input to the bit M0 of register field row 60. Over the next 5 PRTs, the bit indicating a near miss will be successively shifted from left to right in register M of FIG. 6. When the bit indicating a near miss shifts to bit M4 of register field row 62, the signal M424 is activated. In response to the activation of signal M424, the main defruiter logic 78 observes the output of P-side counter 76 to determine whether the output exceeds a selected number. When the output of P-side counter 76 is greater than or equal to the selected number, the main defruiter logic 78 activates the read signal to enable the buffer 32 to provide the reply data corresponding to near miss to be provided to the data processor of the radar signal. On the other hand, if the output of P-side counter 76 does not exceed the selected number, the main defruiter logic 78 does not activate the read signal so that the reply data corresponding to the fruit reply is not provided to the data processor of the radar system and is therefore discarded.

In the embodiment of FIG. 4, the main defruiter logic 78 is provided by a PAL (programmable-array logic). Table 1 is a program listing written in the ABLE language which shows the logic operations provided by the main defruiter logic 78 for the each of the logic states in the timing diagram of FIG. 10. In addition, the instructions for an idle state are also shown in table 1.

TABLE 1

State diagram STATUS
STATE START : RPLYSOn := SODEL;
               RPLYLWSIn := UWSFLAG;
               RPLYUWSIn := 1;
               if !WREN the IDLE;
               else CHK;
STATE CHK :    FFTAG:=7;
               if (HCT>=2) # (PCT>=2) then HOLD;
               else if (HCT==1) & (PCT ==1) then HOLD;
               else if (DFTPAR) then CHG;
               else if (PCT==1) # (HCT==1) then HOLD;
               else CHG;
STATE CHG :    H26 := (PREH26 & OFFDFT);
               PREDFT := PREH26;
               RPLYSOn := !PREH26 & !M424;
               RPLYUWSIn := !( ( !PREH26 &
               M424 & (PCT>=1) ) # (OFFDFT
               & (PREH26 # M424) ) );
               RPLYLWSIn := 1;
               goto WAIT;
STATE HOLD :   H26 := PREH26;
               PREDFT := PREH26;
               RPLYSOn := !PREH26 & !M424;
               RPLYUWSIn := !PREH26 & !( !PRE26
               & M424 & (PCT>1) ) & !(OFFDFT
               & (PREH26 # M424) );
               RPLYLWSIn := 1
               goto WAIT;
STATE WAIT :   H26 := H26;
               PREDFT := PREH26;
               SODEL := RPLYSOn;
               UWSFLAG := RPLYUWSIn;
               FFTAG : = 7;
               goto START;
STATE IDLE :   FFTAG := 7
               SODEL := 1;
               UWSFLAG := 1;
               if WREN then START;
               else IDLE;

In the START state, RPLYSO- is set equal to SODEL which is a variable which indicates whether RPLYSO- was activated in the last two control cycles. RPLYLWSI- is set equal to UWSFLAG which indicates that RPLYUWSI- was activated during the last two control cycles. RPLYUWSI- is set equal to 1 to deactivate the signal. It is then determined whether WREN- is activated. If WREN- is deactivated, control enters an IDLE state. Otherwise, control enters a CHK state.

In the IDLE state, FFTAG, a variable which indicates that state of RPLYSO-, RPLYLWSI- and RPLYUWSI-, respectively, is set to {111} so that each of these signals is deactivated. SODEL is also set to 1 to indicate RPLYUWSI- was not activated in the last 2 control cycles. Likewise, UWSFLAG is set to 1 to indicate that RPLYSO- was not activated during the last two control cycles. When WREN is activated, control moves the start state. Otherwise, control remains in an IDLE state.

After the START state, control enters the CHK state. FFTAG is set to {111} to disable each of the signals, RPLYSO-, RPLYLWSI- and RPLYUWSI-. It is then determined whether the output of the H-side counter 70 or the output of the P-side counter 76 is equal to (11), thus indicating that at least 2 replies occurred in either the H or P registers of register field rows 60, 62 and 64. When at least 2 replies occur in the H or P-side registers of register field row 60, 62 and 64, control enters an HOLD state. Otherwise, the main defruiter logic 78 determines whether only one reply occurred in each of the H and P registers of register field rows 60, 62 and 64. If so, control enters the HOLD state. Otherwise, the main defruiter logic 78 determines whether DFTPAR is activated, thus indicating a window parameter of 2. When DFTPAR is activated, control enters the CHG state. Otherwise it is determined whether the output of the H-side counter 70 or the output of the P-side counter 76 is equal to 1. If so, control enters the HOLD state. Otherwise, control enters the CHG state.

From the foregoing discussion, the meaning of most of the instructions for the CHG, HOLD and WAIT states should be evident. However, the two signals OFFDFT and PREDFT have not been explained. OFFDFT corresponds to a signal which is provided by the radar system to disable the defruiter system 27. PREDFT is a signal which is supplied to a display which is responsive to PREH26.

Figure 7:
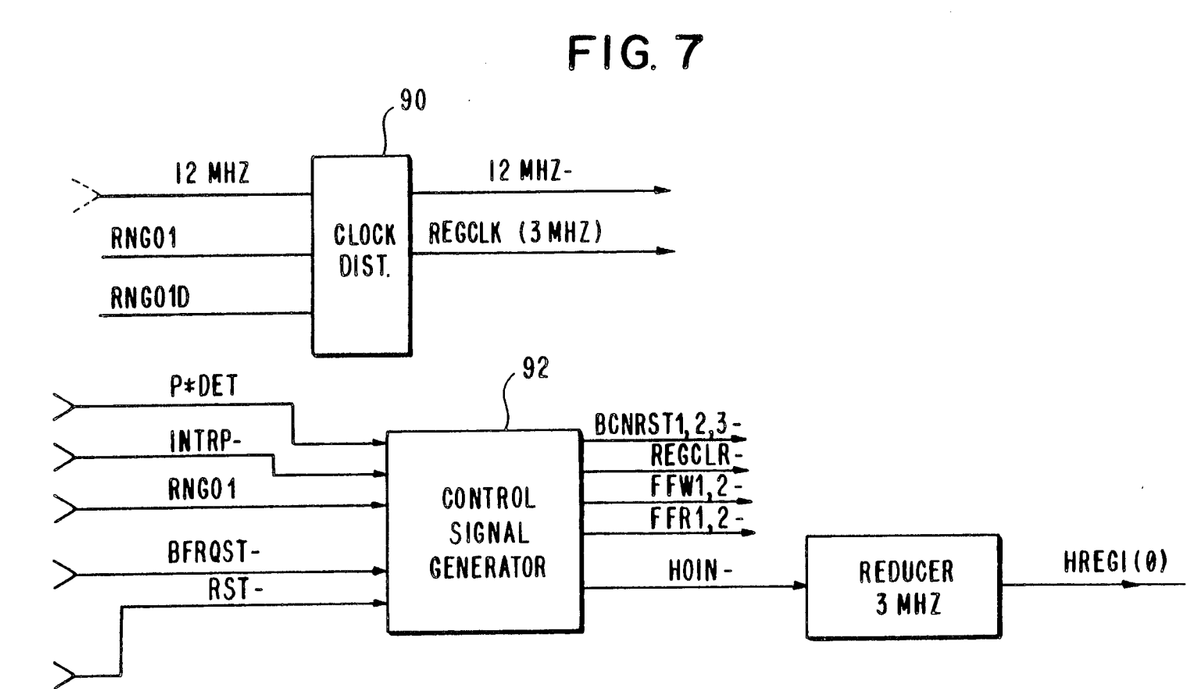
FIG. 7 is a block diagram of the clock distributor 90 and control signal generator 92 used to provide the clock and control signals of either embodiment of the present invention.

FIG. 7 is a block diagram of a clock distributor 90 and a control signal generator 92. The clock distributor 90 provides a 12 MHZ clock signal upon which all control signals are based. The clock distributor 30 also provides a signal REGCLK at a 3 MHZ frequency. The signal REGCLK is used by window memory 20, main memory 22, counter 26, and main defruiter 24 of FIG. 3.

The control signal generator 92 is provided with the signals P*DET, INTRP-, RNG01, BFRQST-, and RST- from the radar system. The signal P*DET indicates the beginning of a new PRT. The signal INTRP- indicates the end of a PRT. RNG01 indicates the beginning of a predetermined set of range intervals. The signal BFRQST- provides reply data to the defruiter system. The signal BCNRSTI, 2, 3- is output to clear the H-side memory 52, the P-side memory 54 and the storage memory 56 of FIG. 4 when activated. The signal REGCLR- can be activated by the control signal generator 92 to clear register field rows 60, 62 and 64 of FIG. 4. The signal FFW1, 2- is output by the control signal generator 92 to enable data to be written to the H-side memory 52 and the P-side memory 54. The signal FFR1, 2- is output from the control signal generator 92 to read data from the H-side memory 52 and the P-side memory 54 of FIG. 4. The control signal generator also provides signal H0IN- based on BFRQST- for the current PRT. The signal H0IN- is provided to the reducer 94 which decreases the bit rate of the signal to a frequency of 3 MHZ to provide output signal HREGI(0).

Figure 8:
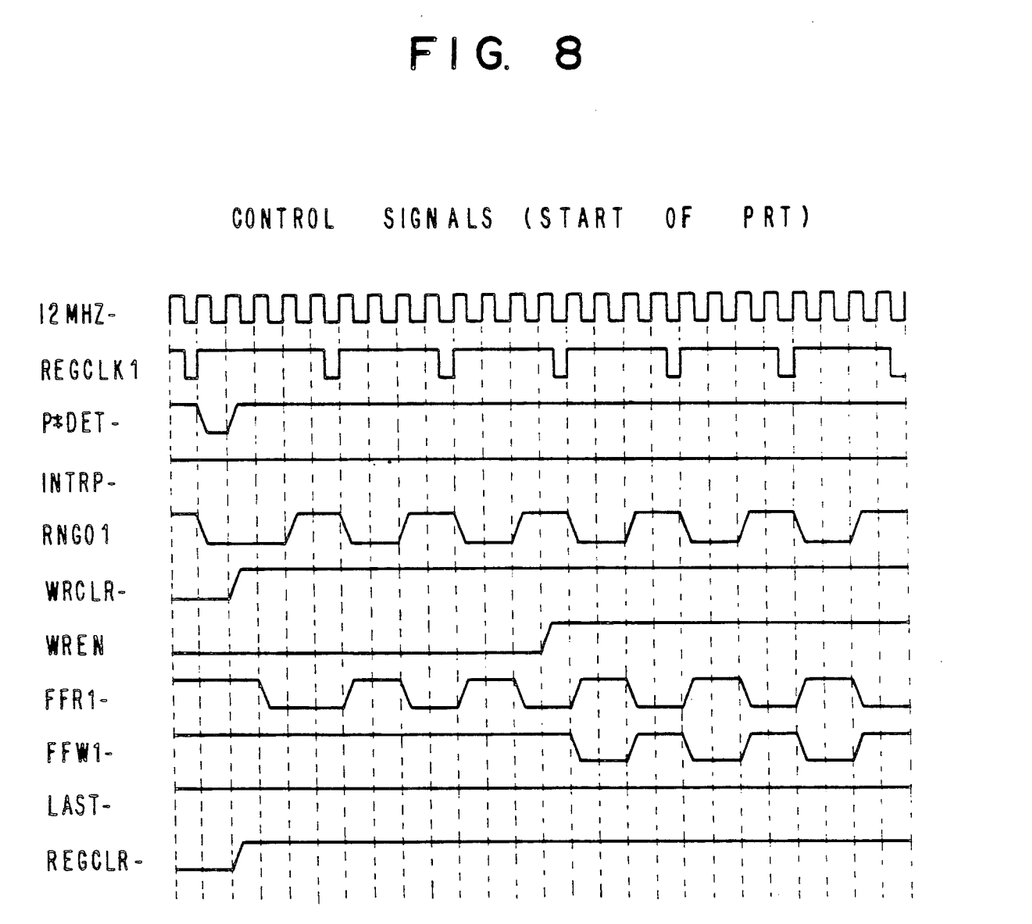
FIG. 8 is a timing diagram of control signals utilized by either embodiment of the present invention during the start of a pulse repetition time.

FIG. 8 is a timing diagram of the clock and control signal states at the beginning of a PRT. At the start of the PRT, P*DET-strobes low for one 12 MHZ- cycle. RNG01 corresponds to the second least significant bit of a range counter and is low at the beginning of a PRT. The control signal WRCLR- and WREN are used to disable the FFW1- signal so that data is written to the H-side memory 52 and the P-side memory 54 at the proper starting time. The signal LAST- has no relevance at the start of a PRT and is therefore disabled in FIG. 8. At the beginning of the PRT, the signal REGCLR- is disabled so that data provided to the register field rows 60, 62 and 64 are not cleared.

Figure 9:
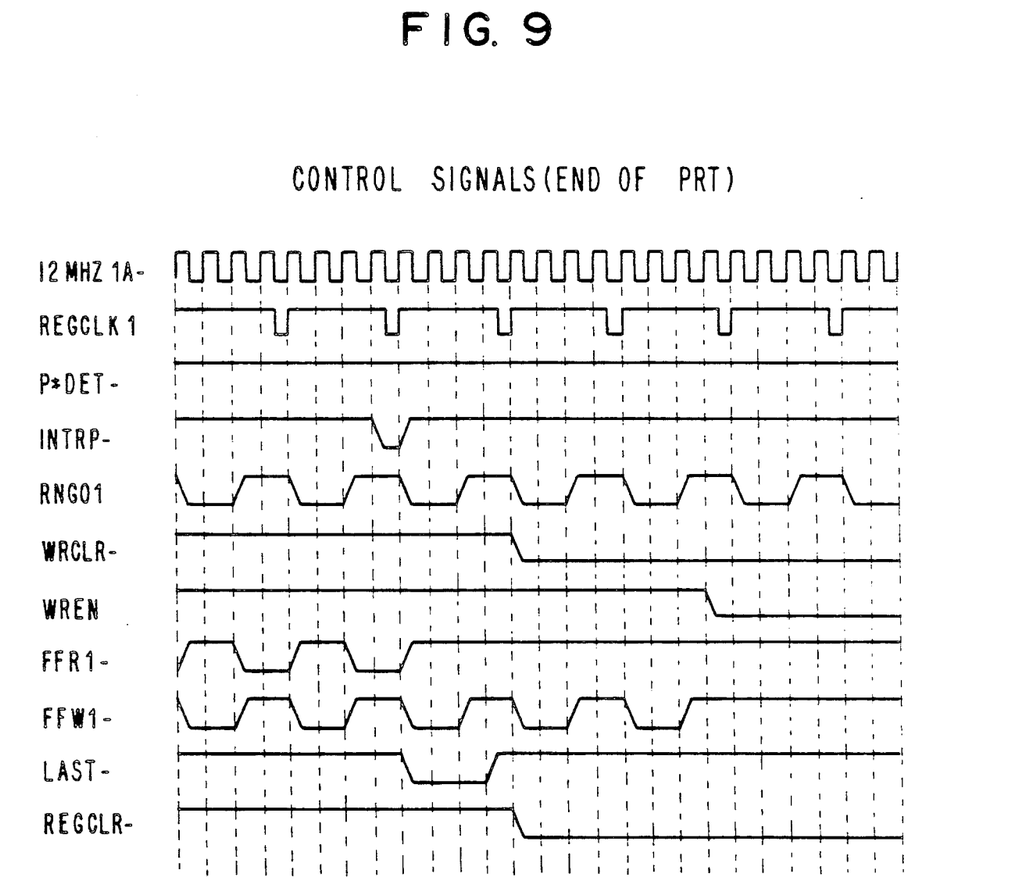
FIG. 9 is a timing diagram of control signals utilized by either embodiment of the present invention during the end of a pulse repetition time.

As shown in FIG. 9, the end of a PRT is indicated by the signal INTRP- which strobes low for one 12 MHZ cycle. The signal FFR1- is immediately disabled to insure that no additional data is read from the H-side memory 52 and the P-side memory 54 of FIG. 4. The signal LAST- goes low one control clock after INTRP- to insure that the system completes its current cycle normally. When signal LAST- is deactivated, the signal WRCLR- goes low. A predetermined number of control cycles after WRCLR- goes low, the signal WREN also goes low, thus forcing the signal FFW1- to be disabled. After the last active cycle of signal FFR1- corresponding to the reply data for the last range interval stored in the H-side memory 52 and the P-side memory 54 is activated, the data in the register field rows 60, 62 and 64 are cleared upon the activation of the signal REGCLR-.

Figure 10:
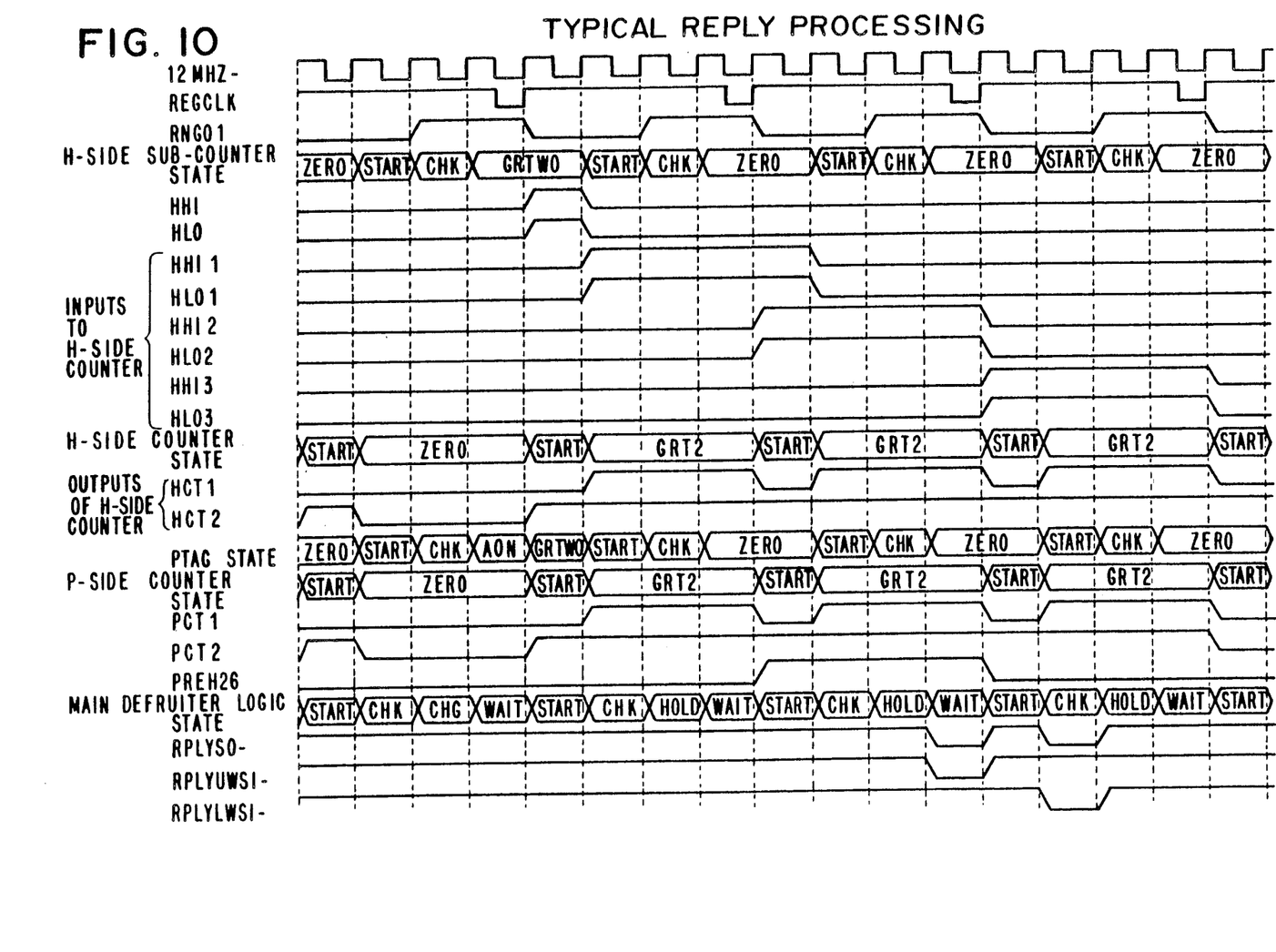
FIG. 10 is a timing and state diagram of a typical reply processing operation of either embodiment of the present invention.

A typical reply processing operation for the embodiment of FIG. 4 is shown in the timing chart of FIG. 10. The signals 12 MHZ-, REGCLK and RNG01 are the same as described above. Signal RPLYSO- is the read signal, and RPLYUWI- and RPLYLWSI- comprise the PROCREAD signal of FIG. 4 which is provided to the data processor of the radar system. On the basis of these signals, the data processor of the radar system may read or not read the reply data provided by output register 58.

The H-side sub-counter state shows the operation of the H-side sub-counter 66 during a PRT. During one control cycle, the H-side sub-counter 66 starts counting the number of replies occurring in bits H0-H6 provided from the input signal HREGI (0) and the output of the H-side memory 52. The H-side sub-counter 66 then determines the number of replies in the check state. This number is then output to H-side counter 70 and D-flip-flops 68 as the 1-bit signals HHI and HLO. The output of H-side sub-counter 66 need only be 2-bits because it registers whether 0, 1, 2 or greater than 2 replies occurred in the input signal to H-side sub-counter 66. In this case, the input to H-side sub-counter 66 is determined to include greater than two replies so that HHI and HLO are both in a high logic state. The signals HHI and HLO are then provided to H-side counter 70 and D-flip-flops 68. The signals HHI1, HLO1, HHI2, HLO2, HHI3 and HLO3 represent the states of the inputs to H-side counter 70. The outputs from H-side sub-counter 66 and D-flip-flops 68 are counted by H-side counter 70 to determine the total number of replies occurring in the H registers of the register field rows 60, 62 and 64. The H-side counter state of FIG. 10 shows the appropriate progression of states for H-side counter 70 during the PRT. H-side counter 70 generates the signals HCT1 and HCT2 as a two-bit word representative of the sum of the replies occurring in the H registers of register field rows 60, 62 and 64, which signals are provided to the main defruiter logic 78. Similar signals and states are illustrated in FIG. 10 for the operation of the P-side sub-counter 72 and P-side counter 76.

In FIG. 10, the signal PREH26 is activated for four control clock cycles to indicate the presence of a reply in H6 of register field row 62. In each of the four control clock cycles, the main defruiter logic 78 cycles through a start, check, change or hold, and wait state. In the timing diagram of FIG. 10, the reply corresponding to the activation of the signal PREH26 is determined to be a true reply, and the signal RPLYSO- is strobed low twice to read the upper and lower halves of a reply data word from the storage memory 56. Further, the signals RPLYUWSI- and RPLYLWSI- are strobed low to alert the data processor of the radar system to read the upper and lower halves of the reply data word.

Figure 11:
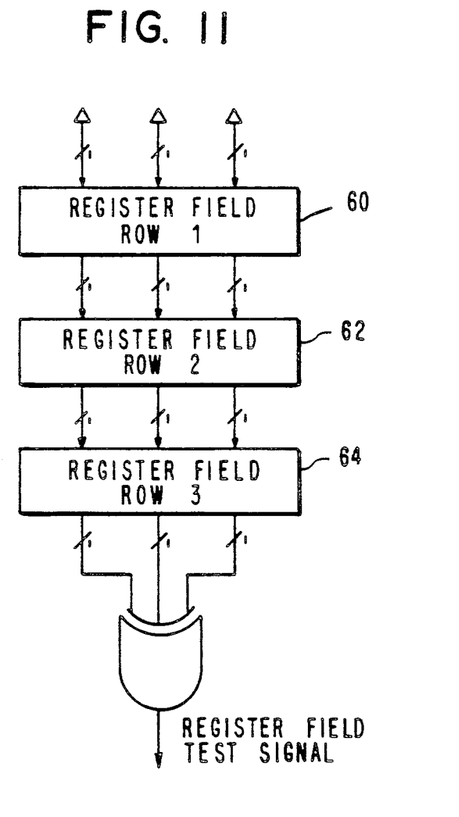
FIG. 11 is a block diagram of the circuitry which provides the register field test.

The embodiment of FIG. 4 can also be equipped with a number of self-tests which are used to ensure that the defruiter is operating properly. The first test is termed a 'register field test'. In FIG. 11, 1 bit from each of the registers in register field row 60 is held to a predetermined logic state. The outputs corresponding to each of these input bits are then provided to 1 bit in each of the registers in register field row 62. Likewise, the output bits of each register in register field row 62 corresponding to each of these input bits are provided as inputs to one bit in each of the registers in register field row 64. The corresponding output bits of each of the registers in register field row 64 are provided to an exclusive-OR gate. When any of the bits provided to the exclusive-OR gate differ from one another, a register field test signal is activated to indicate the possibility that register field rows 60, 62 and 64 are operating improperly. On the other hand, when the bits provided to the exclusive-OR gate have the same logical state, the register field test signal is not activated, thus indicating the probability that register field rows 60, 62 and 64 are operating properly.

Figure 12:
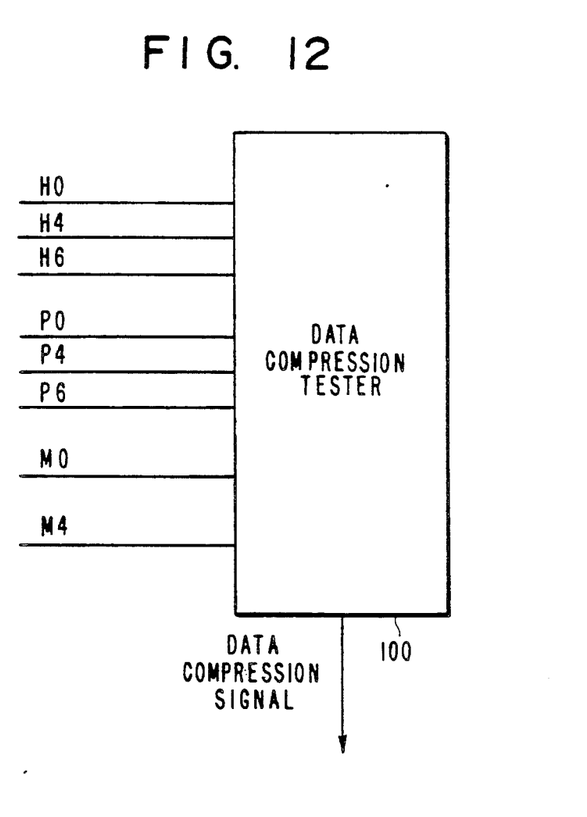
FIG. 12 is a block diagram of the circuitry which provides the data compression test.

The second test is termed the 'data compression test'. In FIG. 12, data-compression tester 100 serially receives the H0, H6 (or H4 in mode-4) P0, P6 (or P4 in mode-4), M0 and M4 bits of register field row 60 and sums the data for one PRT for each bit. The data compression tester 100 stores the results of the summation for each bit. A predetermined number of PRTs later, the data compression tester 100 performs another summing operation on the same data to determine whether the result of the second summation is the same as the result of the first summation. If the two results differ, the data compression tester 100 activates the data compression signal to indicate the possibility of improper operation by the memory input control 50, the H-side memory 52, the P-side memory 54, and register field rows 60, 62 and 64. Otherwise, the data compression tester 100 deactivates the data compression signal.

Figure 13:
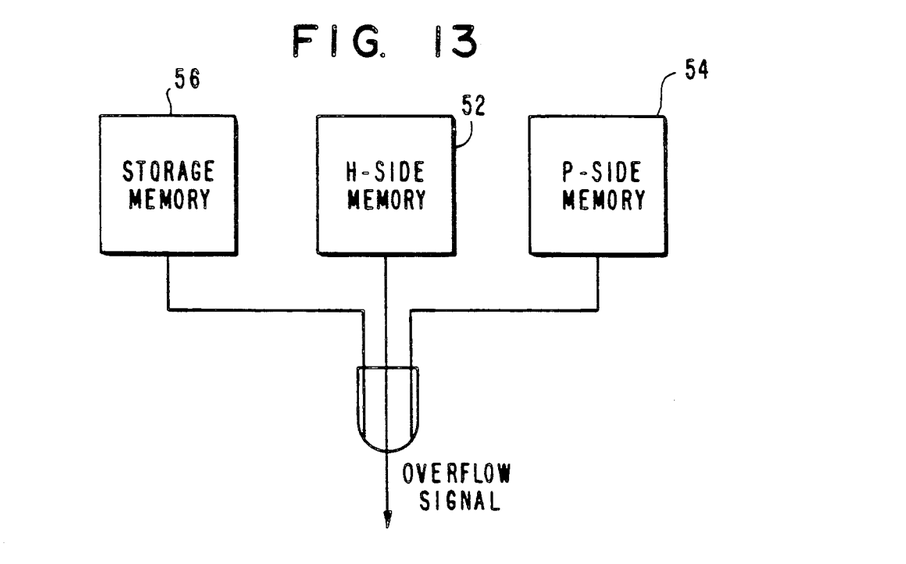
FIG. 13 is a block diagram of the circuitry which provides the overflow test.

The third test is termed the 'overflow test'. The H-side memory 52, P-side memory 54 and storage memory 56 of FIG. 4 include an overflow indicator which is a standard memory output. As shown in FIG. 13, the outputs of the overflow indicators of each of the memories are provided to an OR gate. The output of the OR gate is then provided as an overflow signal which is activated when an overflow condition exists in any of the memories.

Figure 14:
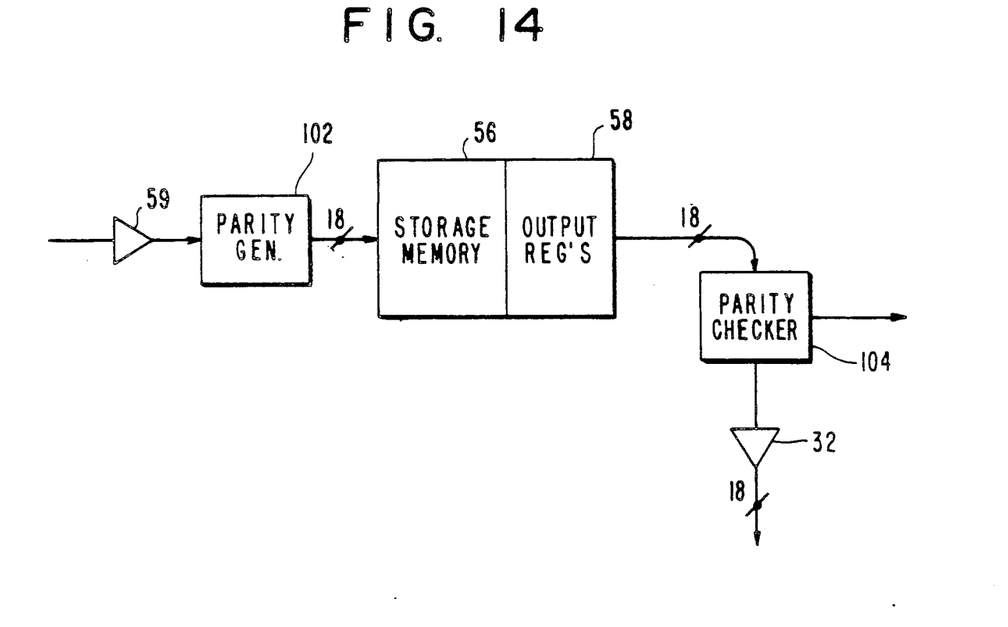
FIG. 14 is a block diagram of the circuitry which provides the parity test.

The fourth test is a parity test. As shown in FIG. 14, a parity generator 102 can be provided at the input to storage memory 56 of FIG. 4. The parity generator 102 provides an additional bit to the reply data provided to the storage memory 56 so that each word of reply data has a predetermined parity. The output of output registers 58 are then observed by a parity checker 104, which activates a parity signal when a reply word provided by output registers 58 does not have the predetermined parity. On the other hand, when a reply word provided by the output registers 58 has the predetermined parity, the parity signal is deactivated to indicate the probability that storage memory 56 and output registers 58 are operating properly.

Figure 15:
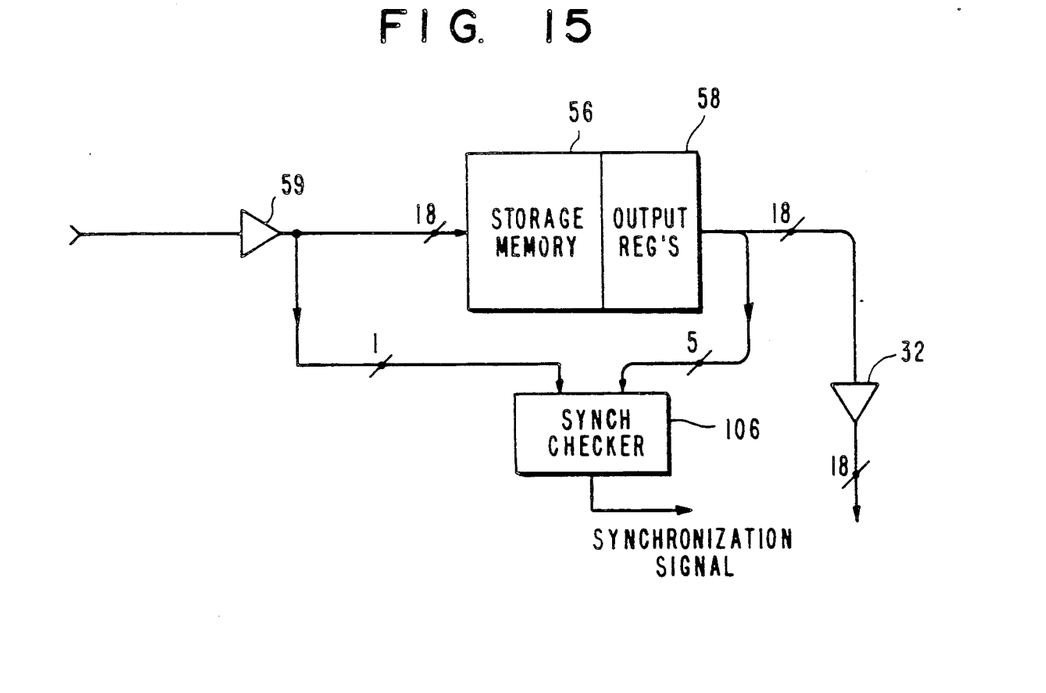
FIG. 15 is a block diagram of the circuitry which provides the synchronization test.

The fifth test is termed the 'synchronization test'. In FIG. 15, a synchronization checker 106 is connected to the input of storage memory 56 and the output of output registers 58 of FIG. 4. The synchronization checker 106 ensures proper timing in the storage memory 56 and output registers 58 of FIG. 4 by establishing that a particular word enters the input of storage memory 56 at the same time a related word is provided at the output registers 58. When the condition is satisfied, the synchronization signal is deactivated to indicate that the timing in storage memory 56 and output registers 58 is correct. On the other hand, when the condition does not occur, the synchronism signal is activated to indicate an error in timing in the storage memory 56 and the output registers 58 of FIG. 4.

Table 2 lists test performance data for the embodiment of FIG. 7. As shown in Table 2, for a window parameter of two and an input of 309,999 fruit replies occurring in 3500 pulse repetition times, the embodiment of FIG. defruited 96.84% of the fruit replies included in the input. Thus, the present invention is effective to greatly decrease the number of fruit replies received by a data processor in a radar system.

TABLE 2

| Fruit Replies In (3500 PRTs) | Replies In/ Second | Window Para- meter | Replies Out | Percent- age Defruited |
| --- | --- | --- | --- | --- |
| 37,758 | 3,109 | 1 | 1,554 | 95.88 |
| 36,902 | 3,038 | 2 | 12 | 99.97 |
| 54,947 | 4,524 | 1 | 3,425 | 93.77 |
| 52,841 | 4,351 | 2 | 42 | 99.92 |
| 71,326 | 5,873 | 1 | 5,495 | 92.30 |
| 71,714 | 5,905 | 2 | 251 | 99.79 |
| 91,932 | 7,570 | 1 | 9,222 | 89.97 |
| 88,838 | 7,315 | 2 | 251 | 99.72 |
| 98,095 | 8,077 | 1 | 10,582 | 89.21 |
| 99,439 | 8,188 | 2 | 306 | 99.69 |
| 111,409 | 9,173 | 1 | 13,554 | 87.83 |
| 111,043 | 9,143 | 2 | 522 | 99.53 |
| 125,431 | 10,328 | 1 | 16,373 | 85.09 |
| 125,211 | 10,310 | 2 | 699 | 99.44 |
| 136,282 | 11,221 | 1 | 20,322 | 85.09 |
| 135,056 | 12,511 | 2 | 812 | 99.40 |
| 153,144 | 12,610 | 1 | 23,252 | 84.82 |
| 151,948 | 12,511 | 2 | 1,571 | 98.97 |
| 229,732 | 18,916 | 1 | 53,306 | 76.80 |
| 228,894 | 18,847 | 2 | 3,746 | 98.36 |
| 278,319 | 22,916 | 1 | 76,799 | 72.41 |
| 279,635 | 23,025 | 2 | 6,783 | 97.57 |
| 308,981 | 25,441 | 1 | 93,919 | 69.60 |
| 307,818 | 25,525 | 2 | 9,676 | 96.86 |
| 310,449 | 25,562 | 1 | 94,743 | 69.48 |
| 309,999 | 25,525 | 2 | 9,789 | 96.84 |

The system of the present invention may be implemented in numerous ways. For example, the main defruiter logic 78 could supply only the PROCREAD signal to the data processor of the radar system which reads reply data from the data memory 30 based on a signal generated by the data processor. Also, the functions provided by the PAL could be provided by a microprocessor or combinational logic. Furthermore, the H-side memory 52, P-side memory 54 and storage memory 56 maybe realized with relatively inexpensive FIFOs.

Each of the embodiments of the present invention provides a filter for fruit replies which reduces the processing time required by a data processor of a radar system by eliminating the need to correlate replies which are determined to be true or near miss replies with a PRT in which they occur. Each embodiment of the present invention also provides fruit filtering for beacon and mode-4 applications. Because the window parameter provided to the defruiter system 27 is variable, each embodiment provides a filter which is adaptable to varying fruit density environments. Each of the embodiments of the present invention also provides a radar system with a resistance to intentional jamming by filtering single sweep strobes. The embodiments of the present invention can also be provided with built-in self-testing capability. Also, the embodiments of the present invention provide a relatively inexpensive fruit filtering capability.

The many features and advantages of the present invention are apparent from the detailed specification and thus, it is intended by the appended claims to cover all such features and advantages of the devices and methods which follow in the true spirit and scope of the invention. Further, since numerous modifications and changes will readily occurred to those skilled in the art, it is not desired to limit the invention to the exact construction and operation illustrated and described. Accordingly, all suitable modifications and equivalence maybe resorted to following within the scope and spirit of the invention.

What is claimed is:

1. Apparatus for filtering fruit replies from a reply data signal in a radar system, comprising:

means for summing a number of replies occurring in first selected range intervals and first selected pulse repetition times of the reply data signal to provide a first result;

means for determining whether the first result is greater than or equal to a window parameter to provide a second result; and means for outputting a defruited data signal corresponding to a second selected range interval and a second selected pulse repetition time of the reply data signal, based on the second result.

2. Apparatus as claimed in claim 1, wherein said apparatus further comprises:

means for modifying a reply data included within the reply data signal, corresponding to the second selected range interval and the second pulse repetition time, based on the second result.

3. Apparatus as claimed in claim 1, wherein said apparatus further comprises:

means for determining whether a reply occurred in the second selected range interval and the second selected pulse repetition time to provide a third result, and for initiating the determining by said means for determining whether the first result is greater than or equal to the window parameter, based on the third result.

4. Apparatus as claimed in claimed in claim 1, wherein said means for summing the number of replies uses three successive range intervals occurring in the reply data signal as the first selected range intervals.

5. Apparatus as claimed in claim 1, wherein said means for summing the number of replies uses six pulse repetition times occurring immediately after the second selected pulse repetition time, and seven pulse repetition times occurring immediately before the second selected pulse repetition time as the first selected pulse repetition times.

6. Apparatus as claimed in claim 1, wherein said means for summing the number of replies uses five pulse repetition times occurring after the second selected pulse repetition time, and seven pulse repetition times occurring immediately before the second selected pulse repetition time as the first selected pulse repetition times.

7. Apparatus as claimed in claim 1, further comprising:
 means for determining whether said means for outputting the defruited data signal is operating in accordance with predetermined criteria.

8. Apparatus for filtering fruit replies from a reply data signal in a radar system, comprising:
 means for determining whether a reply occurred in a first selected range interval and first selected pulse repetition times to provide a first result indicative of a potential near miss reply;
 means for receiving a second result indicative of whether a reply occurred in a second selected range interval and a second selected pulse repetition time based on the first result;
 means for terminating processing of the potential near miss reply and waiting a first selected number of pulse repetition times based on the second result;
 means for waiting a second selected number of pulse repetition times and for summing a number of replies occurring in third selected range intervals and third selected pulse repetition times to provide a third result, based on the second result;
 means for determining whether the third result is greater than or equal to a third selected number to provide a fourth result; and
 means for outputting a defruited data signal based on the reply data signal and the fourth result.

9. Apparatus as claimed in claim 8, wherein said apparatus further comprises:
 means for modifying a reply data included within the reply data signal, corresponding to a fourth selected range interval and a fourth selected pulse repetition time, based on the fourth result.

10. Apparatus as claimed in claim 8, wherein said means for determining whether a reply occurred uses seven pulse repetition times occurring after a current pulse repetition time as the first selected pulse repetition times.

11. Apparatus as claimed in claim 8, wherein said means for receiving the second result uses a current pulse repetition time as the second selected pulse repetition time.

12. Apparatus as claimed in claim 9,
 wherein said means for waiting uses three successive range intervals in the reply data signal as the third selected range intervals, and
 wherein said means for waiting uses seven pulse repetition times occurring immediately before the fourth selected pulse repetition time as the third selected pulse repetition times.

13. A method for filtering fruit replies from a reply data signal in a radar system, comprising the steps of:
 a) summing a number of replies occurring in first selected range intervals and first selected pulse repetition times of the reply data signal to provide a first result;
 b) determining whether the first result of said step (a) is greater than or equal to a window parameter to provide a second result; and
 c) outputting a defruited data signal corresponding to a second selected range interval and a second selected pulse repetition time of the reply data signal, based on the second result of said step (b).

14. A method as claimed in claim 13, further comprising the step of:
 d) modifying reply data included within the reply data signal, corresponding to the second selected range interval and the second selected pulse repetition time, based on the second result of said step (b).

15. A method as claimed in claim 13, further comprising the steps of:
 d) initiating said step (b) when a reply corresponding to the second selected range interval and the second selected pulse repetition time occurs in the reply data signal.

16. A method as claimed in claim 13, wherein said step (a) comprises using three successive range intervals occurring in the reply data signal as the first selected range intervals.

17. A method as claimed in claim 13, wherein said step (a) comprises using six pulse repetition times occurring after the second selected pulse repetition time, and seven pulse repetition times occurring before the second selected pulse repetition time as the first selected pulse repetition times.

18. A method as claimed in claim 13, wherein said step (a) comprises using five pulse repetition times occurring after the second selected pulse repetition time, and seven pulse repetition times occurring before the second selected pulse repetition time as the first selected pulse repetition times.

19. Apparatus for filtering fruit replies from a reply data signal in a radar system, comprising:
 means for summing a number of replies occurring in first selected range intervals and first selected pulse repetition times of the reply data signal to provide a first result;
 means for determining whether the first result is greater than or equal to a window parameter to provide a second result;
 means for outputting a defruited data signal corresponding to a second selected range interval and a second selected pulse repetition time of the reply data signal, based on the second result; and
 means for determining whether a reply occurred in the second selected range interval and the second selected pulse repetition time to provide a third result, and for initiating the determining by said means for determining whether the first result is greater than or equal to the window parameter, based on the third result.

20. A method for filtering fruit replies from a reply data signal in a radar system, comprising the steps of:
 1) summing a number of replies occurring in a first selected range intervals and first selected pulse repetition times of the replay data signal to provide a first result;
b) determining whether the first result of said step (a) is greater than or equal to a window parameter to provide a second result;
c) outputting a defruited data signal corresponding to a second selected range interval and a second selected pulse repetition time of the replay data signal, based on the second result of said step (b); and
d) initiating said step (b) when a reply corresponding to the second selected range interval and the second selected pulse repetition time occurs in the reply data signal.

* * * * *